2,766,243
ACYCLIC, POLYNITRILE-CONTAINING, UNSATURATED COMPOUND AND ITS SALTS, AND PREPARATION THEREOF

William Joseph Middleton, Wilmington, Del., assignor to E. I. du Pont de Nemours and Company, Wilmington, Del., a corporation of Delaware No Drawing. Application April 15, 1955, Serial No. 501,713

12 Claims. (Cl. 260—270)

This invention is concerned with an acyclic, polynitrile-containing, unsaturated compound which is a strong, water-soluble, monohydric organic acid and its salts, and methods for preparing these compounds; and is more particularly concerned with the compound 1,1,2,3,3-pentacyanopropene, salts of this acid with cations of organic or inorganic bases, and preparation of the acid and its salts.

Most carboxylic acids and phenols are weak acids, and the rare exceptions of these types which are relatively strong acids have had limited utility because of disadvantages, such as their difficulty of preparation or instability. Other common acidic organic compounds owe their acidity to inorganic groups and may be classed as organic-substituted inorganic acids. Acids in which the ionizable hydrogen is attached directly to carbon are highly unusual and have received little attention. An easily prepared, strong, water-soluble organic acid of this type which is available in a convenient solid form should be highly useful as an acid and open the way to synthesis of many valuable compounds.

It is an object of this invention to provide a strong, monohydric organic acid, having the ionizable hydrogen directly attached to carbon, and which is available in the form of a highly soluble solid. Another object is to provide salts of the acid. A further object is to provide methods for preparing the acid and its salts. Other objects of the invention will become apparent from the specification and claims.

In accordance with this invention, there has been discovered a new class of chemical compounds, 1,1,2,3,3-pentacyanopropene and its salts, and a process for their preparation by the reaction of tetracyanoethylene with water in the presence of a catalyst at a pH value in the range of 7.5 to 9.5.

1,1,2,3,3-pentacyanopropene is a strong, water-soluble acid. Expressed in terms of the logarithm of the reciprocal of the dissociation constant in water, pKa=1.9. The free acid and its salts are bright yellow in color. When the cationic portion of a salt of this acid is a functional group attached to or associated with a film or fiber composition, the film or fiber is dyed a bright yellow by the presence of the 1,1,2,3,3-pentacyanopropene salt.

It has recently been found that tetracyanoethylene reacts with ammonia and most primary and secondary amines in the presence or absence of water to produce N-tricyanovinylamines, with hydrogen cyanide being formed as a by-product. With certain primary and secondary amines, the reaction proceeds in a similar way to form C-tricyanovinylamines where C is a carbon atom in a ring. Therefore, it is quite unexpected to find that the reaction proceeds in an entirely different manner in the presence of teritary amines (with the exception of teritary aromatic amines having an open 4-position).

In the presence of tertiary amines, with the exceptions noted, or water-soluble alkaline compounds, at a pH of 7.5 to 9.5, tetracyanoethylene reacts with water in accordance with the following reaction to form 1,1,2,3,3-pentacyanopropene:

$$2 \underset{NC}{\overset{NC}{\diagdown}}C=C\underset{CN}{\overset{CN}{\diagup}} + 2H_2O \xrightarrow{BASE} \underset{NC}{\overset{NC}{\diagdown}}C=C\underset{CN}{\overset{CN}{|}}-\underset{CN}{\overset{CN}{\underset{|}{C}}}-H + 3HCN + CO_2$$

The catalysts which are useful in carrying out the reaction of this invention include the following:
1. Tertiary aliphatic amines.
2. Tertiary aromatic amines having a substituent other than hydrogen attached to the ring carbon in the 4-position, considering the carbon attached to the amino group as being in the 1-position.
3. Stable heterocyclic amines (in which the ring is resonance stabilized) having three bonds of the nitrogen atom attached to the ring.
4. Water-soluble alkaline compounds which, when dissolved in the aqueous reaction medium for carrying out the process of this invention, bring the pH of said medium within the specified range of 7.5 to 9.5, e. g., sodium bicarbonate, ethyl sodioacetoacetate, ethyl sodiocyanoacetate, sodiomalononitrile, sodium acetate, and tetramethylammonium bicarbonate.

When the basic catalyst is present in a molecular equivalent amount or a molecular excess, 1,1,2,3,3-pentacyanopropene is readily isolated in the form of its salt with the basic catalyst. The free acid may then be regenerated by treating a solution of the salt with an acidic ion exchange material. The free acid may be isolated as the dihydrate from a solution containing water by evaporating the solution, or the acid may be neutralized with any desired cation of a base to form a salt.

For convenience in naming the salts of 1,1,2,3,3-pentacyanopropene, the anion which is formed by removal of the single hydrogen of this compound has been designated as the 1,1,2,3,3-pentacyanopropenide ion.

In the process of the present invention, the pH range above 9.5 is to be avoided because in strongly alkaline media tetracyanoethylene is consumed in a side reaction with the formation of a viscous polymeric by-product. The pH range below 7.5 is likewise to be avoided because in acidic media, 1,1,2,3,3-pentacyanopropene compounds are consumed in further reactions.

The reaction of tetracyanoethylene with water in the presence of a catalyst takes place readily at room temperature or below. If it is desired to bring the reaction to completion quickly, heating at temperatures up to 100° C. may be employed, but this is ordinarily not necessary.

It is convenient to introduce the tetracyanoethylene into the system in the form of a solution in a water-miscible organic solvent; however, the presence of an organic solvent in the reaction mixture is optional since solid tetracyanoethylene will react directly with an aqueous solution of the catalyst.

In a preferred embodiment of this invention, an aqueous solution of pyridine is added to a cold solution of tetracyanoethylene in acetone. The cold mixture is deep purple in color. It is allowed to warm slowly to room temperature, during which time the solution turns yellow and carbon dioxide gas is evolved. The remaining solution is concentrated by evaporation and a precipitate of pyridinium 1,1,2,3,3-pentacyanopropenide is obtained.

Tetracyanoethylene for use in the present invention may be prepared by the reaction of malononitrile with sulfur monochloride, conveniently in the presence of an inert liquid diluent, and thereafter separating the tetracyanoethylene formed from the reaction mixture.

In the following examples, in which parts are by weight, preparation of 1,1,2,3,3-pentacyanopropene salts from tetracyanoethylene is illustrated in Examples I, II, V, VII, IX, XI, XII and XIII, preparation of 1,1,2,3,3-pentacyanopropene dihydrate is illustrated in Example III, and perparation of salts from the resulting compounds is illustrated in the other examples.

Example I

A solution of 1,280 parts of tetracyanoethylene in 7,920 parts of acetone is cooled to −50° C. Nitrogen is bubbled through the solution until all of the air in the system is displaced. The gas escaping from the system is bubbled through a train of two traps containing a saturated aqueous solution of barium hydroxide. A mixture of 395 parts of pyridine and 1,000 parts of water is added over a period of ten minutes to the cold solution. The intensely purple colored solution is then allowed to warm to room temperature. As the solution becomes warmer, it changes from a purple color to a yellow-brown, and a gas is evolved. The traps containing the barium hydroxide solution become very milky and a white precipitate of barium carbonate forms. The solution is purged with nitrogen, and the barium carbonate in the traps is collected on a filter, washer with water, and dried in a vacuum oven at 100° C. There is obtained 762 parts or 77% of the theoretical amount of barium carbonate based on the following equation:

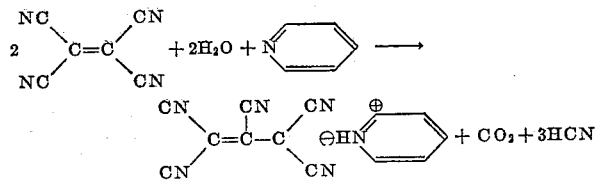

The acetone solution is evaporated to near dryness, and the residue is collected on a filter and washed with a little water. There is obtained 1,000 parts of crude pyridinium 1,1,2,3,3-pentacyanopropenide in the form of a brown solid. The solid is recrystallized from water to give 670 parts of yellow plates, M. P. 167–168° C.

*Analysis.*—Calcd. for $C_{13}H_6N_6$: C, 63.41; H, 2.45; N, 34.14. Found: C, 63.36; H, 2.27; N, 34.29, 34.21.

When N,N-dimethyl-p-toluidine is substituted for pyridine in the process of this example, N,N-dimethyl-p-toluidinium 1,1,2,3,3-pentacyanopropenide is obtained.

Example II

Tetracyanoethylene, 11 parts, is dissolved in 98 parts of pyridine. The solution is heated in the presence of moist air on a steam table for ten minutes. A few drops of the mixture in ether give a precipitate, apparently crystalline. The reaction mixture is drowned in absolute ether, and the precipitate is collected on a filter. The solid is dissolved in 105 parts of glacial acetic acid, filtered, and crystals are recovered by adding slowly 360 parts of ether and cooling. The crystalline product, collected on a filter and dried, fluoresces brilliant blue.

*Analysis.*—Calcd. for $C_{13}H_6N_6$: C, 63.41; H. 2.45; N, 34.14. Found: C, 62.77, 62.86; H, 2.72, 2.72; N, 33.34, 33.52.

Solutions of this compound are bright yellow in color. Ultraviolet absorption is strong at 250μ (characteristic of the pyridine nucleus) and shows other strong absorptions at 393μ and 412μ. The identity of this compound as pyridinium 1,1,2,3,3-pentacyanopropenide is established by its infrared absorption spectrum which is identical to the spectrum of the product in Example I.

Example III

A solution of 20 parts of pyridinium pentacyanopropenide in 40 parts of acetone is passed through an acidic ion-exchange column ("Amberlite IR–120–H") which has been acidified with aqueous acid, washed thoroughly with water, and flushed with acetone to remove part of the water. The material is washed through with additional quantities of acetone. The acetone percolate is evaporated to dryness under a stream of nitrogen. There is obtained 15 parts (91%) of 1,1,2,3,3-pentacyanopropene dihydrate in the form of a yellow-brown solid, M. P. 65°–70° C.

*Analysis.*—Calcd. for $C_8N_5H \cdot 2H_2O$: C, 47.29; H, 2.48; N, 34.48; N. Eq., 203. Found: C, 46.97; H, 2.48; N, 33.39; N. Eq., 209.

The compound is very soluble in ether, water, alcohol, and acetone, and insoluble in benzene, hexane, and carbon tetrachloride. Attempts to remove water of hydration by prolonged drying in a vacuum at room temperature result in decomposition of the sample.

Example IV

Seventy-two parts of triethylamine is added to a solution of 100 parts of pentacyanopropene dihydrate in 1,000 parts of water. The yellow precipitate which forms is collected on a filter, washed with water and recrystallized from water. There is obtained 100 parts of triethylammonium 1,1,2,3,3-pentacyanopropenide in the forms of yellow needles, M. P. 126–128° C.

*Analysis.*—Calcd. for $C_{14}H_{16}N_6$: C, 62.66; H, 6.01; N, 31.32. Found: C, 62.60; H, 5.72; N, 31.37, 31.40.

Example V

To a solution of 128 parts of tetracyanoethylene in 3,960 parts of benzene, triethylamine, 145 parts, is added slowly with stirring in the presence of moist air. An exothermic reaction ensues, and a dark precipitate forms. The black precipitate is collected, washed with benzene, dissolved in chloroform, treated with activated carbon and the chloroform solution is filtered and then drowned in ether. A brown amorphous precipitate of crude triethylammonium 1,1,2,3,3-pentacyanopropenide, 170 parts, forms which melts at 125–130° C. with softening at a lower temperature.

*Analysis.*—Calcd. for $C_{14}H_{16}N_6$: C, 62.66; H, 6.01; N, 31.32. Found: C, 62.56, 62.66; H, 6.39, 6.43; N, 30.60, 30.33.

The identity of this product with the product of Example IV is established by their identical absorption spectra.

Example VI

Ninety-five parts of alpha-picoline is added to a solution of 200 parts of 1,1,2,3,3-pentacyanopropene dihydrate in 2,000 parts of water. Yellow needles separate upon cooling. These needles are collected on a filter, washed with water, and recrystallized from water. There is obtained 150 parts of alpha-picolinium 1,1,2,3,3-pentacyanopropenide in the form of yellow needles, M. P. 85–87° C.

*Analysis.*—Calcd, for $C_{14}H_8N_6$: C, 64.61; H, 3.10; N, 32.30. Found: C, 65.31; H, 3.11; N, 32.25, 32.33.

Example VII

A solution of 93 parts of alpha-picoline in 178 parts of tetrahydrofuran is added slowly to a solution of 128 parts of tetracyanoethylene in 710 parts of tetrahydrofuran in the presence of moist air. The reaction is exothermic, and the solution becomes dark. The reaction mixture is drowned in ether, and a black precipitate forms. The precipitate is purified by dissolving it in tetrahydrofuran, treating with Darco, and reprecipitating with ether. A dark brown, water-insoluble powder of crude alpha-picolinium 1,1,2,3,3 - pentacyanopropenide, M. P. 85–90° C., is obtained.

Example VIII

Seventy-five parts of quinoline is added to a solution of 30 parts of pyridinium 1,1,2,3,3-pentacyanopropenide in 650 parts of 5% sodium bicarbonate solution. The solution is stirred, and then acidified with 1,500 parts of 5% hydrochloric acid. The yellow precipitate which forms is collected on a filter, washed with dilute hydrochloric acid and then water, and recrystallized from water. There is obtained 30 parts of quinolinium 1,1,2,3,3-pentacyanopropenide in the form of yellow needles, M. P. 165–166° C.

Analysis.—Calcd. for $C_{17}H_8N_6$: C, 68.91; H, 2.72; N, 28.37. Found: C, 69.14; H, 2.73; N, 28.59, 28.64.

*Example IX*

A solution of 1,280 parts of tetracyanoethylene in 7,920 parts of acetone is cooled to −60° C., and mixed with a solution of 650 parts of quinoline in 1,000 parts of water and 792 parts of acetone. The mixture is allowed to warm to room temperature, and then poured into 80,000 parts of cold water. The yellow precipitate which forms is collected on a filter, washed with water, and recrystallized from water. There is obtained 685 parts (55%) of quinolinium 1,1,2,3,3-pentacyanopropenide in the form of yellow needles, M. P. 165–166° C. The melting point and mixed melting point of this compound agree with that of the product of Example VIII.

When N,N-dimethyl-2-naphthylamine is substituted for quinoline in the process of this example, the corresponding N,N-dimethyl-2-naphthylammonium 1,1,2,3,3-pentacyanopropenide is obtained.

*Example X*

A solution of 280 parts of pentacyanopropene dihydrate in 1,000 parts of water is mixed with a solution of 165 parts of tetramethylammonium chloride in 500 parts of water. The yellow precipitate which forms is collected, washed with water, dried, and then recrystallized from water. There is obtained 290 parts of tetramethylammonium 1,1,2,3,3-pentacyanopropenide in the form of yellow needles, M. P. 314° C.

Anaylsis.—Calcd. for $C_{12}H_{12}N_6$: C, 59.98; H, 5.04; N, 34.98. Found: C, 60.15; H, 5.06; N, 35.10, 34.80.

*Example XI*

A solution of 79 parts of pyridine in 100 parts of water and 79 parts of acetone is added to a solution of 128 parts of tetracyanoethylene in 713 parts of acetone cooled to −50° C. The mixture is allowed to warm up to room temperature and then mixed with a solution of 110 parts of tetramethylammonium chloride in 6,000 parts of water. The precipitate which forms (100 parts, 83%) is collected on a filter, washed with water, and recrystallized from water. There is obtained 78 parts (65%) of tetramethylammonium 1,1,2,3,3-pentacyanopropenide in the form of yellow needles. The melting point and mixed melting point of this compound are identical with that of the product from Example X.

*Example XII*

A mixture of 50 parts of tetracyanoethylene and 1,000 parts of 5% aqueous sodium bicarbonate is stirred at room temperature until all the solid has gone into solution.

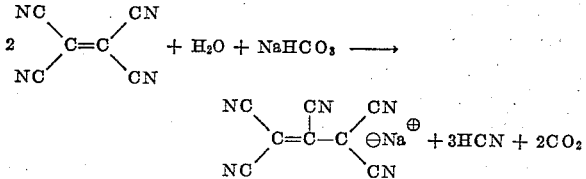

The solution is filtered, and a solution of 50 parts of tetramethylammonium chloride in 50 parts of water is added to the filtrate. A brown precipitate forms which is collected on a filter, washed with water and recrystallized from water after treating with activated carbon and diatomaceous silica. There is obtained 20 parts of tetramethylammonium 1,1,2,3,3-pentacyanopropenide in the form of yellow needles, M. P. 313–314° C.

*Example XIII*

A solution of 256 parts of tetracyanoethylene in 1,425 parts of acetone is cooled in a Dry Ice-acetone bath and a solution of 100 parts of pyridine, 200 parts of water and 158 parts of acetone is added. After standing for fifteen minutes, the mixture is allowed to warm up to room temperature and then poured into a solution of 210 parts of tetraethylammonium bromide in 12,000 parts of water. A precipitate of 180 parts (61%) of tetraethylammonium 1,1,2,3,3-pentacyanopropenide in the form of yellow needles is obtained. Recrystallization of this product from water yields yellow crystals which melt at 220–221° C.

Analysis.—Calcd. for $C_{16}H_{20}N_6$: C, 64.90; H, 6.75; N, 28.35. Found: C, 65.10, 65.00; H, 6.98, 6.81; N, 28.39, 28.46.

*Example XIV*

Ten parts of aniline is added to a solution of 20 parts of 1,1,2,3,3-pentacyanopropene dihydrate in 200 parts of water. The solution is cooled and yellow crystals separate. These are collected on a filter, washed with water, and recrystallized from water. There is obtained 15 parts of anilinium 1,1,2,3,3-pentacyanopropenide in the form of yellow needles, M. P. 145–146° C.

Analysis.—Calcd. for $C_{14}H_8N_6$: C, 64.61; H, 3.10; N, 32.30. Found: C, 65.01; H, 3.27; N, 32.21, 32.36.

*Example XV*

A solution of 15 parts of pyridinium 1,1,2,3,3-pentacyanopropenide in 96 parts of N,N-dimethylaniline is allowed to remain at room temperature for ten minutes. A yellow precipitate forms slowly. The solution is diluted with 357 parts of ether, and the precipitate is collected on a filter, washed with ether, and recrystallized from water after treating with activated carbon. There is obtained 11 parts of N,N-dimethylanilinium 1,1,2,3,3-pentacyanopropenide in the form of yellow crystals, M. P. 124–125° C.

Analysis.—Calcd. for $C_{16}H_{12}N_6$: C, 66.65; H, 4.19; N, 29.15. Found: C, 66.49; H, 4.10; N, 29.45, 29.57.

*Example XVI*

Eighty-six parts of piperidine is added to a solution of 100 parts of 1,1,2,3,3-pentacyanopropene dihydrate in 1,000 parts of water. The yellow crystalline precipitate which forms is collected on a filter. washed with water, and recrystallized from water. There is obtained 130 parts of piperidinium 1,1,2,3,3-pentacyanopropenide in the form of yellow crystals, M. P. 165–167° C.

Analysis.—Calcd. for $C_{13}H_{12}N_6$: C, 61.89; H, 4.80; N, 33.32. Found: C, 62.02; H, 4.55; N, 32.94, 32.91.

*Example XVII*

A solution of 130 parts of 1,1,2,3,3-pentacyanopropene dihydrate in 500 parts of water is mixed with a solution of 91 parts of N-methylpyridinium chloride in 1,000 parts of water. The yellow precipitate of N-methylpyridinium 1,1,2,3,3-pentacyanopropenide which forms is collected on a filter and recrystallized from water. There is obtained 150 parts of yellow needles, M. P. 160–161° C.

Analysis.—Calcd. for $C_{14}H_8N_6$: C, 64.61; H, 3.10; N, 32.30. Found: 64.98; H, 3.21; N, 32.18, 32.27.

*Example XVIII*

Two hundred parts of 1,1,2,3,3-pentacyanopropene dihydrate is dissolved in 2,500 parts of water, and a 5% aqueous solution of silver nitrate is added slowly with stirring until the precipitation is complete. The precipitate is collected on a filter, washed with water, and dried in a vacuum oven at 65° C. There is obtained 237 parts of silver 1,1,2,3,3-pentacyanopropenide in the form of a yellow powder.

Analysis.—Calcd. for $C_8N_5Ag$: C, 35.47; N, 25.56; Ag, 39.37. Found: C, 35.66; N, 25.55, 25.61; Ag, 39.48.

*Example XIX*

A solution of 200 parts of cupric acetate monohydrate in 5,000 parts of hot water is mixed with a solution of 207 parts of pyridinium 1,1,2,3,3-pentacyanopropenide in 2,500 parts of hot water. The hot solution is filtered, and the filtrate is cooled. Long, dark-green crystals separate. These crystals are collected on a filter, washed with water and dried. There is obtained 160 parts of cuprictetrapyridyl 1,1,2,3,3-pentacyanopropenide.

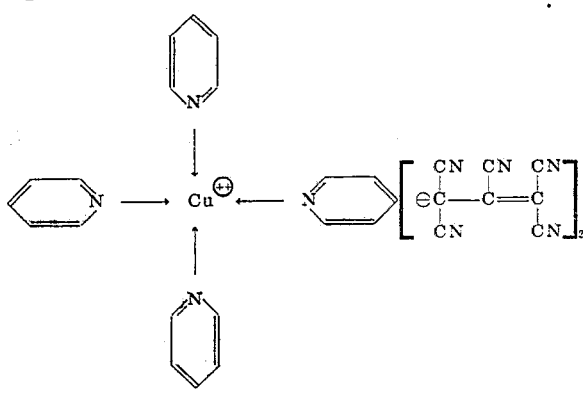

Analysis.—Calcd. for CuC$_{36}$H$_{20}$N$_{14}$: C, 60.58; H, 2.83; N, 27.54; Cu, 8.93. Found: C, 60.84; H, 3.11; N, 27.49; Cu, 8.96.

Example XX

A solution of 10 parts of pyridinium 1,1,2,3,3-pentacyanopropenide in 100 parts of hot water is mixed with a solution of 10 parts of trimethylsulfonium iodide in 100 parts of water. Upon cooling, a yellow precipitate forms. The precipitate is collected on a filter, washed with water, and recrystallized from water to give 10 parts of trimethylsulfonium 1,1,2,3,3-pentacyanopropenide in the form of long yellow needles, M. P. 239–241° C.

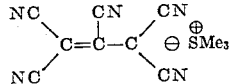

Analysis.—Calcd. for C$_{11}$H$_9$N$_5$S: C, 54.30; H, 3.73; N, 28.79; S, 13.18. Found: C, 54.76; H, 3.57; N, 28.77, 28.64; S, 13.05.

Since 1,1,2,3,3-pentacyanopropene is a surprisingly strong acid, having a pKa of 1.9, it readily forms salts with any cation of a base, either inorganic or organic. Salts of tertiary amines (with the exception of tertiary aromatic amines having an open 4-position) may be prepared directly by using these amines as catalysts in the preparation of the pentacyanopropene from tetracyanoethylene. This has been illustrated in the examples with tertiary aliphatic, aromatic and heterocyclic amines. The preparation of salts of tertiary amines from the pentacyanopropene dihydrate has also been illustrated. Salts of other amines are best prepared from the pentacyanopropene dihydrate, as illustrated in Example XIV for a primary amine, in Example XVI for a secondary amine, and in Examples X and XVII for quaternary amines. Salts of organic bases may also be prepared by metathesis of pentacyanopropene salts, as illustrated in Examples XI and XX.

Metal salts of 1,1,2,3,3,-pentacyanopropene can be readily prepared by the reaction of the free acid with a metal carbonate. Thus, barium carbonate dissolves in an aqueous solution of 1,1,2,3,3,-pentacyanopropene to yield barium 1,1,2,3,3-pentacyanopropenide. When cupric carbonate is used, cupric 1,1,2,3,3-pentacyanopropenide is obtained. These salts are soluble in water. Silver 1,1,2,3,3-pentacyanopropenide is only very slightly soluble in water.

Barium 1,1,2,3,3-pentacyanopropenide is particularly useful for preparing other salts of 1,1,2,3,3-pentacyanopropene by reaction with aqueous solutions of sulfates. The barium sulfate which forms as a by-product is precipitated quantitatively and may be removed by filtration, leaving an aqueous solution of the desired 1,1,2,3,3-pentacyanopropenide salt which is readily isolated by evaporation of the solution. For example, aqueous solutions containing equivalent molar amounts of barium 1,1,2,3,3-pentacyanopropenide and magnesium sulfate, respectively, are mixed. The barium sulfate which forms is filtered off, and magnesium 1,1,2,3,3-pentacyanopropenide is obtained by evaporation of the filtrate. Substitution of ammonium sulfate for the magnesium sulfate in the above procedure gives ammonium 1,1,2,3,3-pentacyanopropenide.

In a similar manner, aqueous solutions of the sulfates of Al, Ce, Cs, Cr$^{++}$, Cr$^{+++}$, Co$^{++}$, Co$^{+++}$, Cu$^{++}$, Fe$^{++}$, Fe$^{+++}$, Ga, In, Ni$^{++}$, Li, K, Mn$^{++}$, Rb, Sn$^{++}$, Sn$^{++++}$, Th, UO$_2$, Zn and Zr react with aqueous barium 1,1,2,3,3-pentacyanopropenide to yield the corresponding metal 1,1,2,3,3-pentacyanopropenides.

It will be seen that the compounds of this invention may be represented by the formula

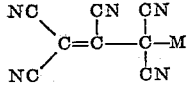

where M is selected from the group consisting of hydrogen, inorganic cations and amine cations.

1,1,2,3,3-pentacyanopropene and its salts precipitate gelatin from aqueous solution. Thus, they are highly useful as hardeners for photographic emulsions and likewise very useful as agents for the tanning of leather.

Although all of the pentacyanopropene compounds of this invention possess a carbon-to-carbon double bond, none of them will add bromine to give the expected dibromopropane compound.

Since many different embodiments of the invention may be made without departing from the spirit and scope thereof, it is to be understood that the invention is not limited by the specific illustrations except to the extent defined in the following claims.

What is claimed is:

1. A compound of the formula

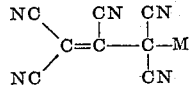

where M is selected from the group consisting of hydrogen, inorganic cations and amine cations.

2. 1,1,2,3,3-pentacyanopropene.
3. 1,1,2,3,3-pentacyanopropene dihydrate.
4. A 1,1,2,3,3-pentacyanopropenide salt.
5. A metal salt of 1,1,2,3,3-pentacyanopropene.
6. A salt of 1,1,2,3,3-pentacyanopropene and an amine.
7. The process for preparing a salt of 1,1,2,3,3-pentacyanopropene which comprises reacting tetracyanoethylene with water at a pH of 7.5 to 9.5 in the presence of a catalyst selected from the group consisting of tertiary aliphatic amines, tertiary aromatic amines having a substituent in the 4-position, stable heterocyclic amines having three bonds of the nitrogen atom attached to the ring, and water-soluble alkaline compounds.
8. The process for preparing a salt of 1,1,2,3,3-pentacyanopropene which comprises reacting tetracyanoethylene with water at a pH of 7.5 to 9.5 in the presence of a catalyst selected from the group consisting of tertiary aliphatic amines, tertiary aromatic amines having a substituent in the 4-position, stable heterocyclic amines having three bonds of the nitrogen attached to the ring, and water-soluble alkaline compounds, and isolating a salt of 1,1,2,3,3-pentacyanopropene.
9. The process for preparing a salt of 1,1,2,3,3-pentacyanopropene which comprises reacting tetracyanoethylene with water at a pH of 7.5 to 9.5 in the presence of sufficient basic catalyst to form a salt of the 1,1,2,3,3-pentacyanopropene formed, the catalyst being selected from the group consisting of tertiary aliphatic amines, tertiary aromatic amines having a substituent in the 4-position, stable heterocyclic amines having three bonds of the nitrogen attached to the ring, and water-soluble alkaline compounds.

10. The process for preparing a salt of 1,1,2,3,3-pentacyanopropene which comprises reacting tetracyanoethylene with water at a pH of 7.5 to 9.5 in the presence of a catalyst selected from the group consisting of tertiary aliphatic amines, tertiary aromatic amines having a substituent in the 4-position, stable heterocyclic amines having three bonds of the nitrogen attached to the ring, and water-soluble alkaline compounds, isolating the resulting 1,1,2,3,3-pentacyanopropenide salt, treating a solution of this salt with an acidic ion exchange material to form a solution of 1,1,2,3,3-pentacyanopropene, and neutralizing the 1,1,2,3,3-pentacyanopropene with a cation to form the desired salt thereof.

11. A process as defined in claim 10 in which the 1,1,2,3,3-pentacyanopropene is isolated as the dihydrate before neutralization to form the salt.

12. The process for preparing 1,1,2,3,3-pentacyanopropene in solid form which comprises treating a solution of a 1,1,2,3,3-pentacyanopropenide salt, formed by reacting tetracyanoethylene with water at a pH of 7.5 to 9.5 in the presence of a basic catalyst, with an acidic ion exchange material to form a solution of 1,1,2,3,3-pentacyanopropene, and evaporating the solution in the presence of sufficient water to form 1,1,2,3,3-pentacyanopropene dihydrate.

References Cited in the file of this patent
UNITED STATES PATENTS 2,541,351     Gilbert _____ Feb. 13, 1951

OTHER REFERENCES

Urushibara et al.: 31, C. A., 1681 (1937).